United States Patent
Kim

(10) Patent No.: US 8,910,741 B2
(45) Date of Patent: Dec. 16, 2014

(54) STEERING DEVICE FOR TRACTOR

(75) Inventor: Joong-Ho Kim, Chungcheongbuk-do (KR)

(73) Assignee: Daeho Co., Ltd., Dongi-myun, Okcheon-gun, Chuncheongbuk-do (KR)

( * ) Notice: Subject to any disclaimer, the term of this patent is extended or adjusted under 35 U.S.C. 154(b) by 0 days.

(21) Appl. No.: 14/005,797

(22) PCT Filed: Mar. 19, 2012

(86) PCT No.: PCT/KR2012/001961
§ 371 (c)(1),
(2), (4) Date: Sep. 17, 2013

(87) PCT Pub. No.: WO2012/128525
PCT Pub. Date: Sep. 27, 2012

(65) Prior Publication Data
US 2014/0008885 A1      Jan. 9, 2014

(30) Foreign Application Priority Data

Mar. 23, 2011    (KR) .................. 10-2011-0025876

(51) Int. Cl.
*B62D 7/08* (2006.01)
*B62D 7/10* (2006.01)
*B62D 9/00* (2006.01)

(52) U.S. Cl.
CPC .. *B62D 7/08* (2013.01); *B62D 7/10* (2013.01); *B62D 9/00* (2013.01)
USPC ........... 180/435; 180/434; 180/436; 180/439; 280/773

(58) Field of Classification Search
USPC ................ 180/197, 433–440; 280/98, 773
See application file for complete search history.

(56) References Cited

U.S. PATENT DOCUMENTS

| | | | | |
|---|---|---|---|---|
| 3,315,759 | A * | 4/1967 | Bohlen | 180/6.24 |
| 4,114,724 | A * | 9/1978 | Doolittle | 180/435 |
| 4,566,554 | A * | 1/1986 | Suzuki | 180/249 |
| 4,609,064 | A * | 9/1986 | Suzuki et al. | 180/233 |
| 4,903,789 | A * | 2/1990 | Nakata et al. | 180/435 |
| 5,088,573 | A * | 2/1992 | Moll | 180/415 |
| 5,303,636 | A * | 4/1994 | Stephenson et al. | 91/471 |
| 7,467,683 | B2 * | 12/2008 | Malvestio | 180/266 |
| 2009/0205885 | A1 * | 8/2009 | Strong | 180/24.02 |

FOREIGN PATENT DOCUMENTS

| | | | |
|---|---|---|---|
| JP | 05-032101 A | | 2/1993 |
| JP | 6008110 B2 | | 2/1994 |
| JP | 09-226615 A | | 9/1997 |
| JP | 09226615 A | * | 9/1997 |
| JP | 2008-179331 A | | 8/2008 |

* cited by examiner

*Primary Examiner* — Paul N Dickson
*Assistant Examiner* — Darlene P Condra
(74) *Attorney, Agent, or Firm* — John K. Park; Park Law Firm

(57) ABSTRACT

The present invention relates, in general, to a steering device for tractor and, more particularly, to a steering device for a tractor for enabling front wheels of the tractor to be turned to an angle over or approximate to a right angle with respect to the longitudinal direction of the tractor by means of a driver manipulating a steering handle, thus making it possible to increase the steering angle of the front wheels and making the turning of the front wheels smoother, whereby the tractor can turn around in place and easily perform different kinds of tasks, for example, a task required in a limited space, a task where there is a need for turning the tractor around in place, etc.

7 Claims, 5 Drawing Sheets

STEERING DEVICE FOR TRACTOR

TECHNICAL FIELD

The present invention relates, in general, to steering devices for tractors and, more particularly, to a steering device for a tractor for enabling front wheels of the tractor to be turned to an angle over or approximate to a right angle with respect to the longitudinal direction of the tractor by means of a driver manipulating a steering handle, thus making it possible to increase the steering angle of the front wheels and making the turning of the front wheels smoother, whereby the tractor can turn around in place and easily perform different kinds of tasks, for example, a task required in a limited space, a task where there is a need for turning the tractor around in place, etc.

BACKGROUND ART

Generally, a tractor is an engineering vehicle designed to deliver a high tractive force and conduct different kinds of work in the fields of agriculture or construction. At present, tractors used in agriculture typically include a front loader provided on a front end of a tractor body, and an attachment mounted to the front loader so as to conduct various kinds of work, such as transportation, unloading, loading, etc. Furthermore, a rotavator or the like is mounted to a rear end of the tractor body by a rear link so that work such as plowing can be conducted.

In such tractors used in agriculture, power generated from an engine is classified into movement-related power which is transmitted to wheels through a transmission to enable a tractor to move, and PTO (power take-off)-related power which is used to drive different kinds of operating implements mounted to the tractor. To embody transmission of the movement-related power, a four-wheel drive system is typically used.

Typically, the conventional tractor is configured such that when a driver rotates a steering wheel in a clockwise or counterclockwise direction, the front wheels are turned to the left or the right by a steering device. In the case where the front wheel axles are directly coupled to the respective front wheels, when the steering wheel is completely rotated, angles to which the front wheels can be turned cannot be over 60°. Therefore, although the steering wheel is completely rotated, the minimum turning radius of the tractor is comparatively wide. Thus, when the tractor is required to be turned around, the tractor must repeatedly move forwards and backwards to accomplish such a task.

In the case of typical use, the tractor having the above-mentioned construction must run or turn in place depending on conditions of a work site or the kind of work. As stated above, if the minimum turning radius of the tractor is comparatively wide, the tractor cannot cope with a small area or the case where it must turn around in place, thus reducing work efficiency.

DISCLOSURE

Technical Problem

Accordingly, the present invention has been made keeping in mind the above problems occurring in the prior art, and an object of the present invention is to provide a steering device for a tractor for enabling front wheels of the tractor to be turned to an angle over or approximate to a right angle with respect to the longitudinal direction of the tractor by means of a driver manipulating a steering handle, thus making it possible to increase the steering angle of the front wheels and making the turning of the front wheels smoother, whereby the tractor can turn around in place and easily perform different kinds of tasks, for example, a task required in a limited space, a task where there is a need for turning the tractor around in place, etc.

Technical Solution

In order to accomplish the above object, in an aspect, the present invention provides a steering device for a tractor, including a steering cylinder receiving, by means of hydraulic pressure, a steering force generated when a driver manipulates a steering wheel and turning front wheels of the tractor, wherein the steering cylinder comprises a cylinder body and left and right cylinder rods provided to be extended from and retracted into the cylinder body to the left and the right, the steering cylinder being disposed at a position spaced apart from a front wheel axle housing by a predetermined distance and being parallel to the front wheel axle housing, ends of the left and right cylinder rods are respectively hinged to swing links to form a first four-bar link structure that is swung by extension and retraction of the steering cylinder, whereby the front wheels are steered, and a support link is hinged at a first end thereof to the front wheel axle housing and hinged at a second end thereof to the cylinder body so that when the steering cylinder is operated, the steering cylinder is allowed to move forwards or rearwards within a predetermined range while being prevented from moving to the left or the right.

The support link may include upper and lower support links, wherein either the upper support link or the lower support link may be hinged to an upper portion of the front wheel axle housing and an upper portion of the cylinder body, and the other support link may be hinged to a lower portion of the front wheel axle housing and a lower portion of the main body of the steering cylinder.

The steering device may further include
a second four-bar link structure provided on each of left and right ends of the four-bar link structure, the second four-bar link structure including: the swing link; a swing arm provided on the corresponding end of the front wheel axle housing to turn the front wheel; and a rod link hinged at a first end thereof to the swing arm and hinged at a second end thereof to the swing arm.

The steering device may further include a device for sensing a steering angle of the steering cylinder, wherein when the device for sensing the steering angle senses that a steering angle of the steering cylinder exceeds a predetermined range, a four-wheel drive mode in which the front wheels and rear wheels are rotated at a same rpm is converted to a differential four-wheel drive mode in which a difference in rpm between the front wheels and the rear wheels is adjusted.

Furthermore, the device for sensing a steering angle of the steering cylinder may include: a guide rail provided parallel to the steering cylinder and coupled at opposite ends thereof to the respective ends of the cylinder rods, with a sensing protrusion provided on the guide rail, so that when the cylinder rods move, the guide rail is moved, and the steering angle of the steering cylinder is sensed by the sensing protrusion.

In another aspect, the present invention provides a steering device for a tractor, including a steering cylinder receiving, by means of hydraulic pressure, a steering force generated when a driver manipulates a steering wheel and turning front wheels of the tractor, wherein the steering cylinder comprises a cylinder body and left and right cylinder rods provided to be extended from and retracted into the cylinder body to the left and the right, the steering cylinder being disposed at a position spaced apart from a front wheel axle housing by a predetermined distance and being parallel to the front wheel axle housing, a guide rail is provided parallel to the steering cylinder and coupled at opposite ends thereof to the respective ends of the cylinder rods, and a range of a steering angle to which the steering cylinder is operated is determined by sensing a movement range of the guide rail that is moved along with movement of the cylinder rods.

The guide rail may have in a surface thereof a depression having a predetermined length, and a limit switch may be installed to be brought into contact with the surface of the guide rail, wherein when the guide rail moves, the limit switch senses a signal when the limit switch is disposed in the depression and a signal when the limit switch departs from the depression, thus determining a range of a steering angle to which the steering cylinder is operated.

When the steering angle to which the steering cylinder is operated exceeds a predetermined range, a four-wheel drive mode in which the front wheels and rear wheels are rotated at a same rpm may be converted to a differential four-wheel drive mode in which a difference in rpm between the front wheels and the rear wheels is adjusted.

Advantageous Effects

A steering device for a tractor according to the present invention includes a steering cylinder which receives, by means of hydraulic pressure, a steering force generated when a driver manipulates a steering wheel and turns the front wheels of the tractor. Four-bar link structures are provided on ends of left and right cylinder rods of the steering cylinder such that the front wheels can be steered. A support link is hinged to a front wheel axle housing and a cylinder body of the steering cylinder so that when the steering cylinder is operated, the steering cylinder is allowed to move forwards or rearwards within a predetermined range while being prevented from moving to the left or the right. Therefore, even when the front wheels are turned to an angle over or approximate to a right angle with respect to the longitudinal direction of the tractor, the cylinder rods of the steering cylinder can be prevented from being bent. Thereby, the steering angles of the front wheel can be further increased, and the front wheels can be more smoothly turned.

Furthermore, in the steering device according to the present invention configured such that the steering cylinder receives by means of hydraulic pressure a steering force generated when the driver manipulates the steering wheel and turns front wheels of the tractor, a range of the steering angle to which the steering cylinder is operated is automatically sensed by a simple structure. When the steering angle of the steering cylinder exceeds a predetermined range, the drive mode of the front wheels and the rear wheels is converted to AWD (all wheel drive) mode. Thus, even when the front wheels are turned to an angle over or approximate to a right angle with respect to the longitudinal direction of the tractor so that the tractor is turned around in one place, the front wheels are prevented from being excessively pushed forwards by the rear wheels, whereby the tractor can be more smoothly turned around.

Figure 1:
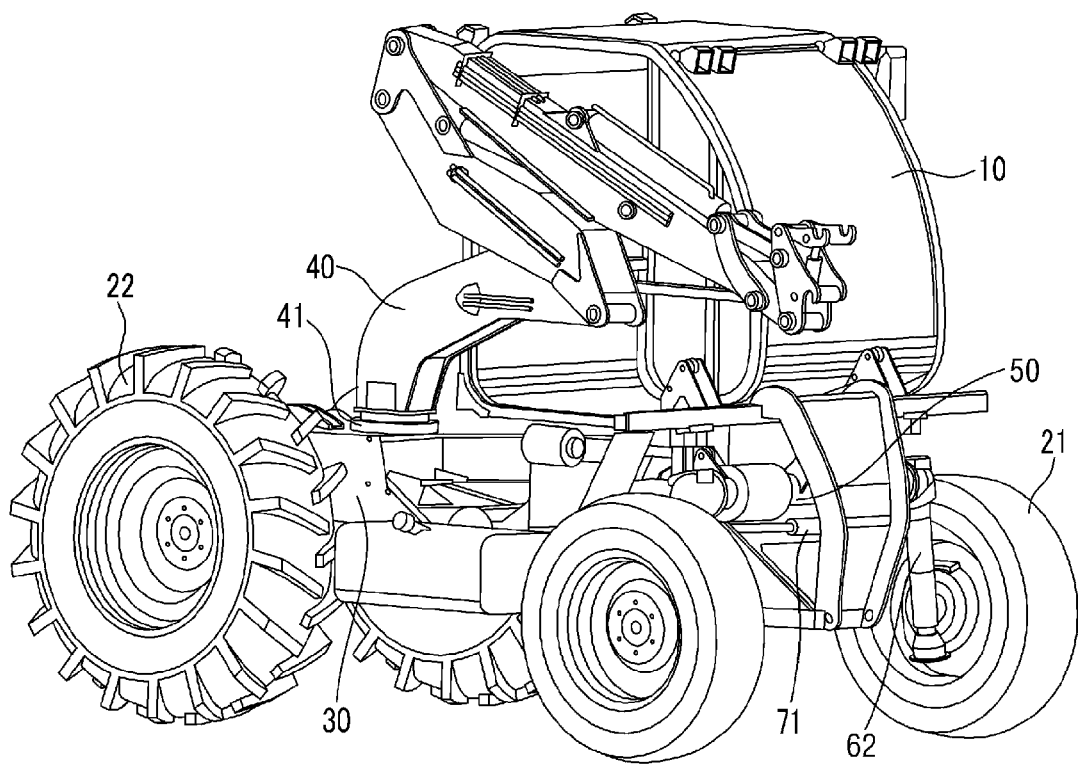
FIG. 1 is a perspective view illustrating a tractor, according to an embodiment of the present invention.

DESCRIPTION OF THE REFERENCE
NUMERALS IN THE DRAWINGS

10: driver cab
21: front wheel
21a: wheel frame
21b: wheel rotating shaft
22: rear wheel
30: body frame
40: articulated arm
41: rotating shaft
50: front wheel axle housing
51: front wheel differential device
62: swing housing
63, 64, 66: bevel gear
65: bevel gear shaft
67: rotating member
68: front-wheel-shaft coupling housing
71: steering cylinder
72: cylinder rod
73: swing link
74: rod link
75: swing arm
81: support link
81a, 81b: hinge coupling part
82: fixed bracket
82 91: guide rail
91a, 91b: protrusion
92: sensing unit
92a: limit switch

BEST MODE

Hereinafter, a tractor according to the present invention will be described in detail with reference to the attached drawings.

As shown in FIG. 1, in an embodiment of a tractor according to the present invention, a driver cab 10 having a driver seat therein is located on a left side portion of a body frame 30 of the tractor, and an articulated arm 40 is disposed on a portion of the body frame 30 where the driver cab 10 is not located, so as to maintain the balance of the tractor. The articulated arm 40 is coupled to a rotating shaft 41 so that the articulated arm 40 can be rotated along with the rotating shaft 41. In detail, the driver cab 10 is disposed between front wheels 21 and rear wheels 22 of the tractor and located on the left side portion of the tractor such that a space is formed beside the driver cab 10. When the articulated arm 40 is not in use, the articulated arm 40 is disposed in this space.

In the front of the body frame 30, a steering cylinder 71 is installed in front of a front wheel axle housing 50 which receives front wheel axles 53 therein. The steering cylinder 71 includes left and right cylinder rods 72 which are extended and retracted to the left and the right by steering force transmitted by hydraulic pressure when the driver manipulates a steering wheel. The front wheel axles 53 are disposed at a height corresponding to top surfaces of the front wheels 21.

A steering device for tractors according to the present invention is not limited to the construction including the driver cab 10, the articulated arm 40, etc. shown in FIG. 1.

The steering device of the tractor according to the embodiment of the present invention will be explained below with reference to FIGS. 2 through 5.

The steering device for tractors according to the present invention is a device for turning the front wheels of the tractor in the clockwise or counterclockwise direction and is disposed in front of the front wheel axle housing 50 which receives the front wheel axles 53 therein.

The steering device includes the steering cylinder 71 which is provided in front of the front wheel axle housing at a position spaced apart from the front wheel axle housing 50 by a predetermined distance and is oriented parallel to the front wheel axle housing 50. The left and right cylinder rods 72 of the steering cylinder 71 are extended and retracted to the left and the right by steering force transmitted by hydraulic pressure when the driver manipulates the steering wheel. Ends of the left and right cylinder rods 72 are respectively hinged to swing links 73, thus forming a first four-bar link structure. Second four-bar link structures are formed on left and right sides of the first four-bar link structure so that the steering angles of the front wheels can be further increased, and the front wheels can be more smoothly turned.

The first four-bar link structure is configured such that first ends of the left and right swing links 73 are hinged to the front wheel axle housing 50 and second ends thereof are respectively hinged to the ends of the left and right cylinder rods 72. Thus, when the left and right cylinder rods 72 are extended and retracted so that they move to the left or the right, the left and right swing links 73 are swung to the left or the right.

Each second four-bar link structure includes the swing link 73, a swing arm 75 which is provided on the end of the front wheel axle housing 50 to steer the front wheel, and a rod link 74 which is hinged at a first end thereof to the swing link 73 while a second end thereof is hinged to the swing arm 75.

As such, the first four-bar link structure is formed both by the steering cylinder 71 having the left and right cylinder rods 72 and by the two swing links 73. In addition, the second four-bar link structures are respectively provided on the left and right sides of the first four-bar link structure. As a result, the angular range within which the front wheels 21 can be turned can be increased to 70° to 110°. Further, when the front wheels are steered, they can be controlled such that the steering angle of the front wheel that is disposed at a side corresponding to the direction in which the tractor turns is larger than the steering angle of the front wheel that is disposed at the other side, thus making the turning of the tractor smoother.

Figure 4:
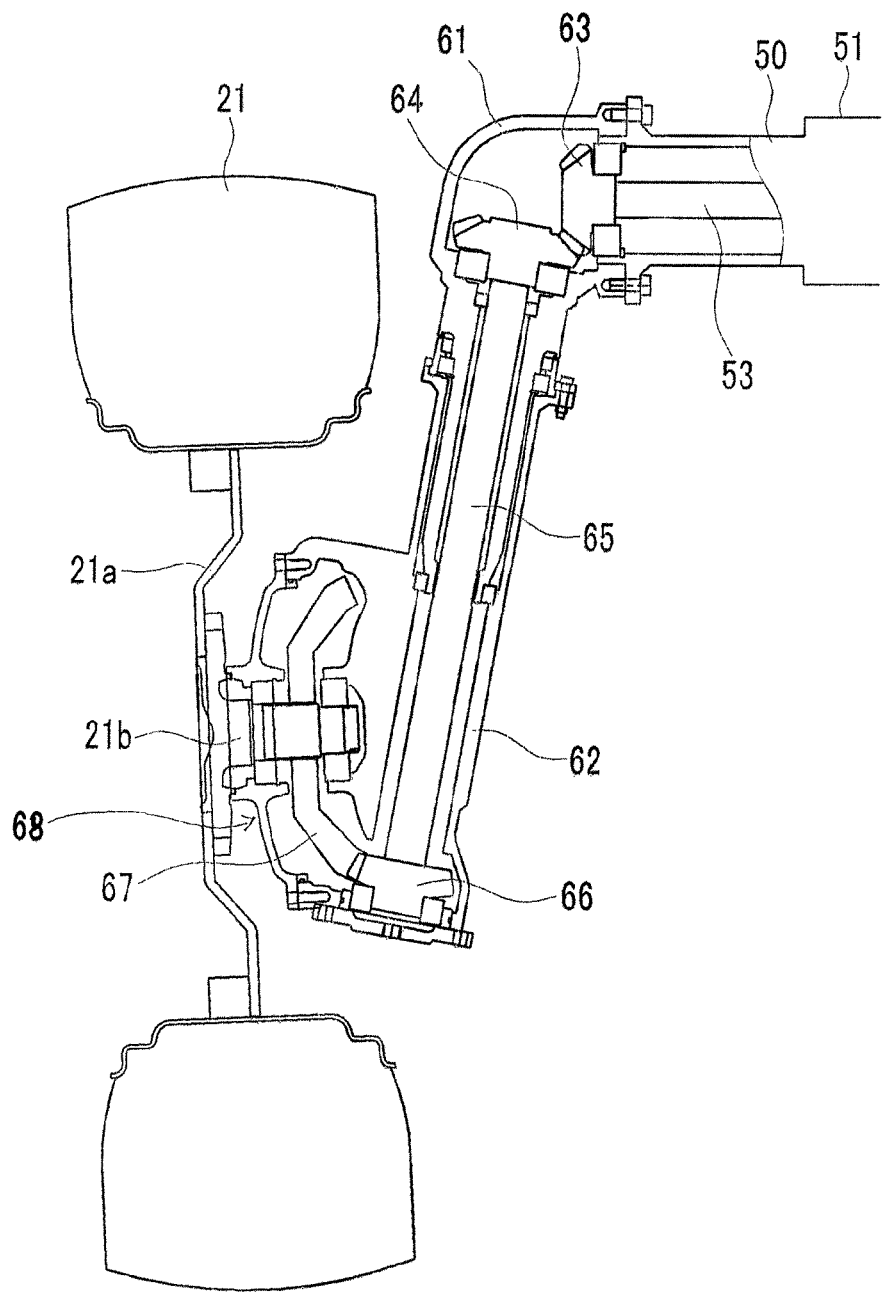
FIG. 4 is a view showing in detail a drive device of a front wheel part of the tractor according to the present invention.
Figure 5:
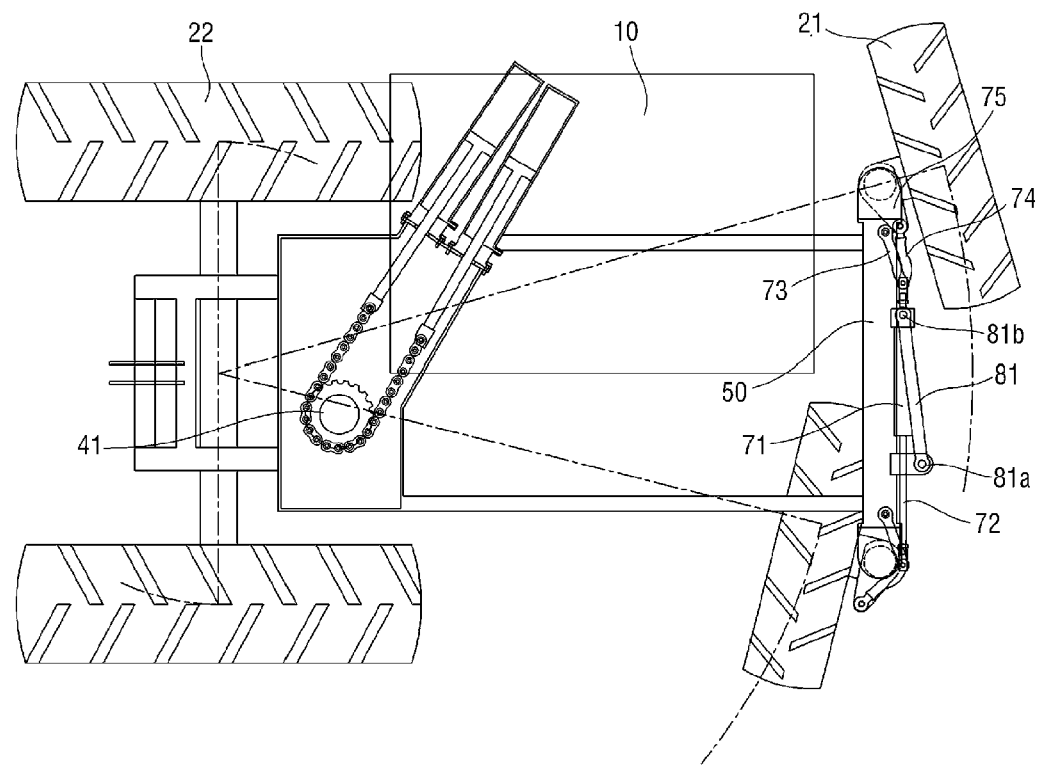
FIG. 5 is a view showing the front wheels of the tractor which have been turned to the maximum angles in the clockwise direction.

As shown in FIG. 4, the front wheel axles 53 and the front wheel axle housing 50 are disposed at heights corresponding to the top surfaces of the front wheels 21 so that when the steering device is turned to the maximum angle (70° to 110°) in the clockwise direction or the counterclockwise direction, the front wheels 21 can be prevented from being impeded by the front wheel axles 53 or the front wheel axle housing 50 that receives the front wheel axles therein. In this case, a path along which power is transmitted from the front wheel axles 53 to the front wheels 21 has a "⌈ ⌉" shape, as shown in FIGS. 4 and 5.

A structure of rotating each front wheel 21 in the case where the front wheel axles 53 and the front wheel axle housing 50 are disposed at a height corresponding to the top surfaces of the front wheels 21 will be explained with reference to FIG. 4.

As shown in FIG. 4, power is horizontally transmitted from a front wheel differential device 51 to the left and right front wheel axles 53. Bevel gears 63 and 64 are provided on an end of each front wheel axle 53 and convert the direction of power transmission such that power transmitted to the front wheel axle 53 acts in the vertical direction. A bevel gear shaft 65 extends downwards from the bevel gear 64. A bevel gear 66 is provided on a lower end of the bevel gear shaft 65. The bevel gear 66 engages with a rotating member 67 which is provided to rotate the corresponding front wheel 21. The rotating member 67 is housed in a front-wheel-shaft coupling housing 68.

A gear unit housing 61 is coupled to an end of the front wheel axle housing 50 by a flange coupling structure. The gear unit housing 61 functions to protect the bevel gears 63 and 64 and prevent foreign substances from entering the front wheel axle housing 50. A swing housing 62 is coupled to a lower end of the gear unit housing 61 such that the swing housing 62 can be rotated with respect to the gear unit housing 61 by operation of the steering device. The bevel gear shaft 65, the bevel gear 66 and the rotating member 67 are housed in the swing housing 62.

Each front wheel 21 includes a wheel frame 21a, over which a tire is fitted. A wheel rotating shaft 21b is provided on a central portion of the wheel frame 21a. The wheel rotating shaft 21b is coupled to the rotating member 67 so that the front wheel 21 is rotated by the rotation of the rotating member 67.

Figure 2:
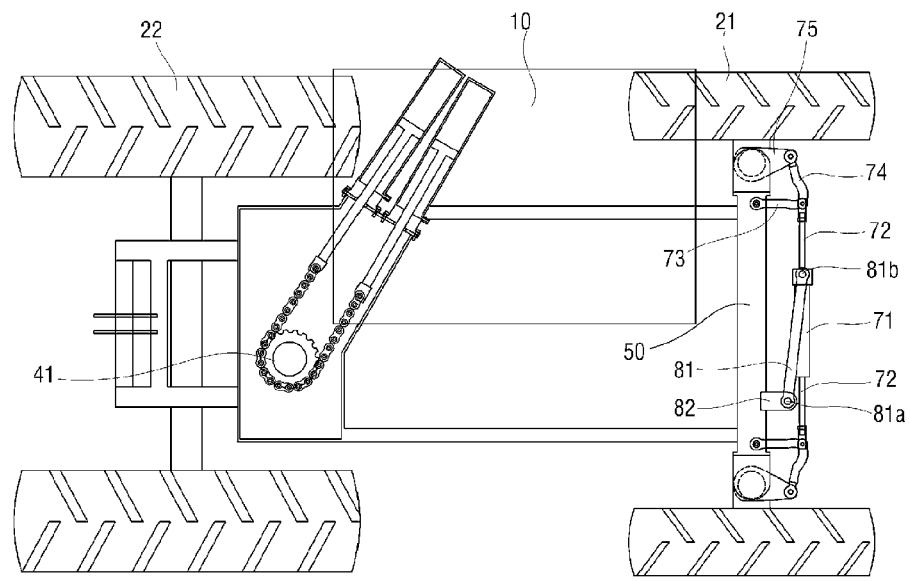
FIG. 2 is a plan view showing a critical portion of the tractor according to the present invention.
Figure 3:
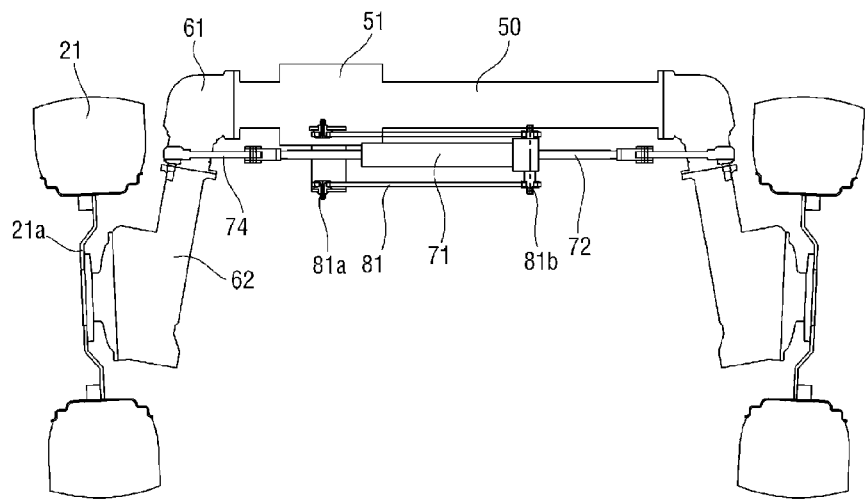
FIG. 3 is a front view illustrating a steering device of the tractor according to the present invention.

As shown in FIGS. 2 and 3, the steering cylinder 71 includes a support link 81 which is hinged at a first end thereof to the front wheel axle housing 50 and hinged at a second end thereof to a cylinder body of the steering cylinder 71. The support link 81 is configured such that when the steering cylinder 71 is operated, the steering cylinder 71 can move in the forward-rearward direction within a predetermined distance range without moving in the left-right direction. In detail, the first end (a hinge coupling part 81a) of the support link 81 is hinged to an end of a fixed bracket 82 which is fixed to a portion of the front wheel axle housing 50. The second end (a hinge coupling part 81b) of the support link 81 is hinged to a portion of the cylinder body of the steering cylinder 71. Thereby, the steering cylinder 71 is allowed to move in the forward-rearward direction within a predetermined distance range while being restricted from moving in the left-right direction.

The support link 81 comprises two (upper and lower) support links 81 so as to make the coupling of the steering cylinder 71 to the front wheel axle housing 50 more reliable. Either of the support links 81 is hinged to an upper portion of the front wheel axle housing 50 and an upper portion of the cylinder body of the steering cylinder 71. The other support link 81 is hinged to a lower portion of the front wheel axle housing 50 and a lower portion of the cylinder body of the steering cylinder 71.

By virtue of the above-mentioned construction, in the steering device for tractors according to the present invention, the first four-bar link structure and the second four-bar link structures can more flexibly cope with inclined movement which occurs attributable to camber angles of the front wheels 21. Further, even when the front wheels 21 are turned to an angle over or approximate to a right angle with respect to the longitudinal direction of the tractor, the cylinder rods 72 of the steering cylinder 71 can be prevented from being bent.

Thereby, the steering angles of the front wheels 21 can be further increased, and the front wheels 21 can be more smoothly turned.

In the tractor having the above-mentioned construction, when the driver completely rotates the steering wheel in the clockwise direction, the front wheels enter the state of FIG. 5.

As shown in FIG. 4, when the driver completely rotates the steering wheel in the clockwise direction, an inside one of the front wheels 21 can be turned to 90° or more (in a range of 90° to 105°), and an outside one can be turned to an angle of less than 90° (in a range of 80° to 89°). Because the inner wheel of the front wheels 21 is turned along with the outer wheel by the steering device, the angle to which the inner wheel is completely turned is determined by a maximum turning angle to which the outer wheel can be turned.

Preferably, the maximum turning angles of the inner wheel and the outer wheel are limited to angles at which the tractor can turn in place with the minimum turning radius. Here, the turning angles of the front wheels 21 at which the tractor can turn in place with the minimum turning radius can be determined by width and length of a rectangle defined by the front wheels 21 and the rear wheels 22. Preferably, the maximum turning angle of the inner wheel of the front wheels 21 is limited to a predetermined angle within a range of 90° to 105° with respect to the straight running direction of the tractor, and the maximum turning angle of the outer wheel of the front wheels 21 is limited to a predetermined angle within a range of 80° to 89° with respect to the straight running direction of the tractor.

In this case, to turn the tractor in place in a desired direction (in a clockwise direction or a counterclockwise direction), if the driver completely rotates the steering wheel in the desired direction (in a clockwise direction or a counterclockwise direction) and then drives the tractor, the tractor can be turned in place in the desired direction.

Figure 6:
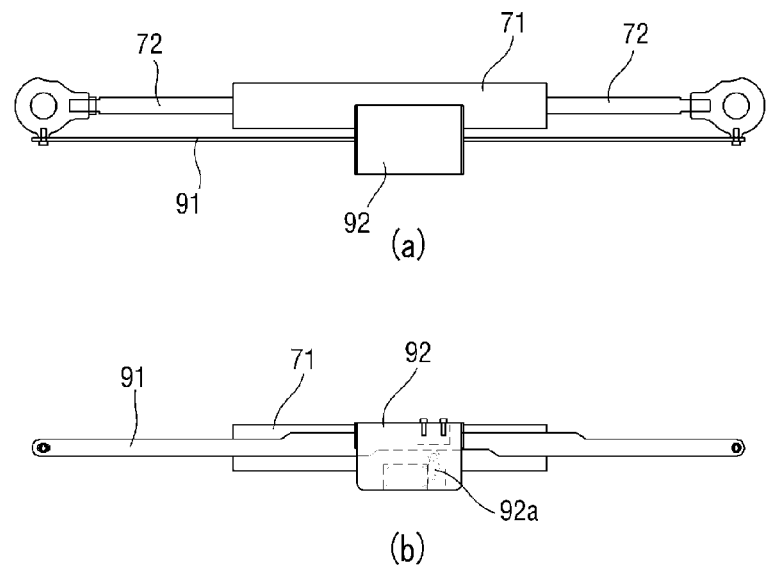
FIGS. 6a and 6b are respectively a plan view and a front view showing installation of a guide rail according to the present invention.
Figure 7:
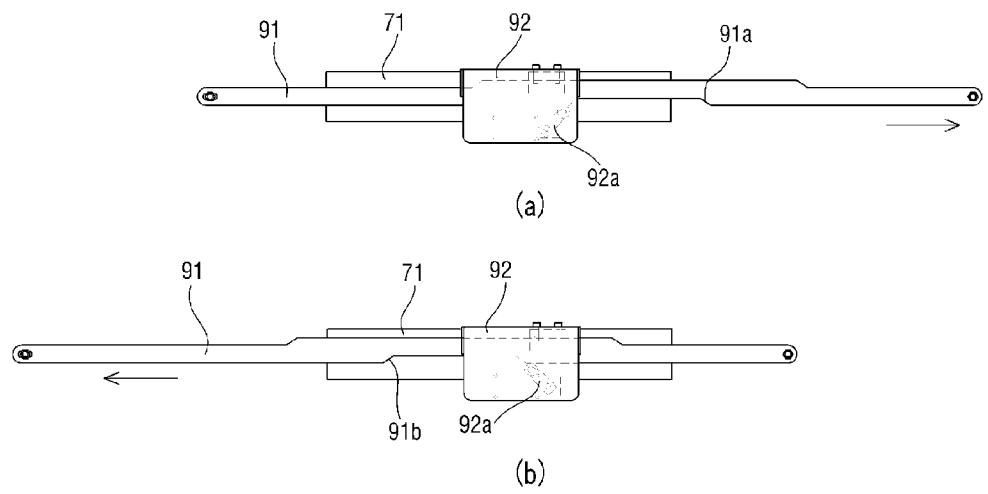
FIGS. 7a and 7b are front views showing rightward movement and leftward movement of the guide rail according to the present invention.

Meanwhile, a device for sensing the steering angle of the steering cylinder in the steering device for tractors according to the present invention will be described with reference to FIGS. 6 and 7.

In the steering device for tractors according to the present invention, as shown in FIGS. 6a (the plan view) and 6b (the front view), the device for sensing the steering angle of the steering cylinder 71 includes a guide rail 91 which is oriented parallel to the steering cylinder 71, and opposite ends of which are respectively coupled to the ends of the cylinder rods 72 so that when the cylinder rods 72 are moved to the left and the right by the operation of the steering cylinder 71, the guide rail 91 moves along with the cylinder rods 72. A sensing unit 92 for sensing a movement range of the guide rail 91 is fixed to the steering cylinder 71 and disposed on a medial portion of the guide rail 91. The sensing unit 92 has a guide for preventing the guide rail 91 from moving in an incorrect direction.

A depression having a predetermined length is formed in a surface of the guide rail 91. Protrusions 91a and 91b are provided on respective boundaries between the depression and opposite parts of the guide rail 91 other than the depression. Coming into contact with the surface of the guide rail 91, a limit switch 92a is installed in the sensing unit 92. While the guide rail 91 moves, the limit switch 92a senses a signal when it is disposed in the depression and a signal when it departs from the depression, thus determining a range of a steering angle to which the steering cylinder 71 is operated. In FIGS. 6 and 7, although the limit switch 92a has been illustrated as being used as the means for determining a moving range of the guide rail 91, any means can be used so long as it can determine the moving range of the guide rail 91.

A process of sensing a steering angle of the steering cylinder 71 using the device for sensing the steering angle of the steering cylinder 71 will be explained with reference to FIGS. 7a and 7b.

FIG. 7a illustrates a case where when the driver rotates the steering wheel to a predetermined angle in the clockwise direction, the steering cylinder 71 receives, by a means of hydraulic pressure, the steering force generated by the steering wheel manipulation of the driver and extends the left cylinder rod 72 while retracting the right cylinder rod 72 so that the guide rail 91 the opposite ends of which are coupled to the ends of the cylinder rods 72 are moved to the left by the movement of the cylinder rods 72. When the guide rail 91 is moved to the left, the limit switch 92a that makes contact with the surface of the guide rail 91 passes over the depression of the guide rail 91 and then comes into contact with the protrusion 91a that forms the boundary between the depression and the corresponding portion of the guide rail 91 other than the depression. At this time, the limit switch 92a generates a signal (ON/OFF) indicating that the guide rail 91 has moved over a predetermined range and then transmits the signal to the sensing unit 92.

FIG. 7b illustrates a case where when the driver rotates the steering wheel to a predetermined angle in the counterclockwise direction, the steering cylinder 71 receives, by a means of hydraulic pressure, the steering force generated by the steering wheel manipulation of the driver and extends the right cylinder rod 72 while retracting the left cylinder rod 72 so that the guide rail 91, the opposite ends of which are coupled to the ends of the cylinder rods 72, is moved to the right by the movement of the cylinder rods 72. When the guide rail 91 is moved to the right, the limit switch 92a that makes contact with the surface of the guide rail 91 passes over the depression of the guide rail 91 and then comes into contact with the protrusion 91a that forms the boundary between the depression and the corresponding portion of the guide rail 91 other than the depression. At this time, the limit switch 92a generates a signal (ON/OFF) indicating that the guide rail 91 has moved over a predetermined range and then transmits the signal to the sensing unit 92.

In the steering device for tractors according to the present invention having the above-mentioned construction, the sensing unit 92 automatically senses a signal indicating that the guide rail 91 has moved over a predetermined range, thus making it possible to automatically sense that the front wheels have been turned at a steering angle over a predetermined range by the operation of the steering cylinder 71.

When it is sensed that a steering angle of the steering cylinder 71 exceeds a predetermined range (when the device, shown in FIGS. 6 and 7, for sensing the steering angle of the steering cylinder or other structure senses that a steering angle of the steering cylinder 71 exceeds a predetermined range), in other words, when it is sensed that the front wheels have been turned over a predetermined angular range, the drive mode of the tractor is converted from a four-wheel drive mode in which the front wheels and the rear wheels are driven with the same rpm to a differential four-wheel drive mode in which a difference in rpm between the front wheels and the rear wheels is adjusted, thus automatically adjusting the rpm of the front wheels and the rpm of the rear wheels. In this way, the present invention can prevent a phenomenon in which the rear wheels push the front wheels because of a difference in a movement rate with respect to the forward direction of the tractor between the front wheels and the rear wheels.

Meanwhile, when the steering cylinder 71 that has been turned to an angle over the predetermined range is turned to an angle within the predetermined range, the limit switch 92a is disposed in the depression of the guide rail 91. In this case, the drive mode for the front wheels and the rear wheels is converted from the differential four-wheel drive mode to the four-wheel drive mode in which the front wheels and the rear wheels rotate at the same rpm.

By virtue of the above-mentioned construction, even when the front wheels are turned by the steering cylinder to an angle over or approximate to a right angle with respect to the longitudinal direction of the tractor so that the tractor is turned around in one place, the front wheels are prevented from being excessively pushed forward by the rear wheels, whereby the tractor can be more smoothly turned around.

Although the preferred embodiment of the present invention has been disclosed for illustrative purposes, those skilled in the art will appreciate that various modifications, additions and substitutions are possible, without departing from the scope and spirit of the invention as disclosed in the accompanying claims.

The invention claimed is:

1. A steering device for a tractor, comprising a steering cylinder receiving, by means of hydraulic pressure, a steering force generated when a driver manipulates a steering wheel and turning front wheels of the tractor,
   wherein the steering cylinder comprises a cylinder body and left and right cylinder rods provided to be extended from and retracted into the cylinder body to the left and the right, the steering cylinder being disposed at a position spaced apart from a front wheel axle housing by a predetermined distance and being parallel to the front wheel axle housing,
   ends of the left and right cylinder rods are respectively hinged to swing links to form a first four-bar link structure that is swung by extension and retraction of the steering cylinder, whereby the front wheels are steered,
   a support link is hinged at a first end thereof to the front wheel axle housing and hinged at a second end thereof to the cylinder body so that when the steering cylinder is operated, the steering cylinder is allowed to move forwards or rearwards within a predetermined range while being prevented from moving to the left or the right, and
   a device for sensing a steering angle of the steering cylinder, wherein when the device for sensing the steering angle senses that a steering angle of the steering cylinder exceeds a predetermined range, a four-wheel drive mode in which the front wheels and rear wheels are rotated at a same rpm is converted to a differential four-wheel drive mode in which a difference in rpm between the front wheels and the rear wheels is adjusted,
   wherein the device for sensing a steering angle of the steering cylinder comprises:
   a guide rail provided parallel to the steering cylinder and coupled at opposite ends thereof to the respective ends of the cylinder rods, with a sensing protrusion provided on the guide rail, so that when the cylinder rods move, the guide rail is moved, and the steering angle of the steering cylinder is sensed by the sensing protrusion.

2. The steering device of claim 1, wherein the support link comprises upper and lower support links, wherein either the upper support link or the lower support link is hinged to an upper portion of the front wheel axle housing and an upper portion of the cylinder body, and the other support link is hinged to a lower portion of the front wheel axle housing and a lower portion of the main body of the steering cylinder.

3. The steering device of claim 1, further comprising
   a second four-bar link structure provided on each of left and right ends of the four-bar link structure, the second four-bar link structure comprising:
   the swing link;
   a swing arm provided on the corresponding end of the front wheel axle housing to turn the front wheel; and
   a rod link hinged at a first end thereof to the swing link and hinged at a second end thereof to the swing arm.

4. The steering device of claim 1, wherein the guide rail has in a surface thereof a depression having a predetermined length, and a limit switch is installed to be brought into contact with the surface of the guide rail,
   wherein when the guide rail moves, the limit switch senses a signal when the limit switch is disposed in the depression and a signal when the limit switch departs from the depression, thus determining a range of a steering angle to which the steering cylinder is operated.

5. The steering device of claim 4, wherein when the steering angle to which the steering cylinder is operated exceeds a predetermined range, a four-wheel drive mode in which the front wheels and rear wheels are rotated at a same rpm is converted to a differential four-wheel drive mode in which a difference in rpm between the front wheels and the rear wheels is adjusted.

6. A steering device for a tractor, comprising a steering cylinder receiving, by means of hydraulic pressure, a steering force generated when a driver manipulates a steering wheel and turning front wheels of the tractor,
   wherein the steering cylinder comprises a cylinder body and left and right cylinder rods provided to be extended from and retracted into the cylinder body to the left and the right, the steering cylinder being disposed at a position spaced apart from a front wheel axle housing by a predetermined distance and being parallel to the front wheel axle housing,
   a guide rail is provided parallel to the steering cylinder and coupled at opposite ends thereof to the respective ends of the cylinder rods, and
   a range of a steering angle to which the steering cylinder is operated is determined by sensing a movement range of the guide rail that is moved along with movement of the cylinder rods.

7. The steering device of claim 6, wherein when the steering angle to which the steering cylinder is operated exceeds a predetermined range, a four-wheel drive mode in which the front wheels and rear wheels are rotated at a same rpm is converted to a differential four-wheel drive mode in which a difference in rpm between the front wheels and the rear wheels is adjusted.

* * * * *